United States Patent [19]

Kitamura

[11] Patent Number: 5,336,538

[45] Date of Patent: Aug. 9, 1994

[54] IMPACT ABSORBING AIR BAG AND METHOD FOR MANUFACTURING SAME

[75] Inventor: Atsushi Kitamura, Kanazawa, Japan

[73] Assignee: Asahi Kasei Kogyo Kabushiki Kaisha, Osaka, Japan

[21] Appl. No.: 423,449

[22] PCT Filed: Dec. 10, 1988

[86] PCT No.: PCT/JP88/01253

§ 371 Date: Sep. 28, 1989

§ 102(e) Date: Sep. 28, 1989

[87] PCT Pub. No.: WO89/05250

PCT Pub. Date: Jun. 15, 1989

[30] Foreign Application Priority Data

Dec. 11, 1987 [JP] Japan .................. 62-314934

[51] Int. Cl.$^5$ .................. B60R 21/16; D03D 3/02
[52] U.S. Cl. .................. 428/35.2; 428/35.5; 428/196; 428/257; 280/728 R; 280/743 R; 383/3; 383/117; 139/389; 139/387 R
[58] Field of Search .............. 280/728, 743, 729, 731, 280/742, 736, 737, 740, 741, 743; 383/109, 3, 117; 428/35.2, 35.5, 166, 196, 257, 68; 139/291 R, 382 R, 389, 384 R, 390

[56] References Cited

U.S. PATENT DOCUMENTS

| | | | |
|---|---|---|---|
| 3,575,776 | 4/1971 | MacIntyre | 139/384 R |
| 3,991,249 | 11/1976 | Yamashita et al. | 139/389 |
| 4,025,684 | 5/1977 | Neidhardt | 139/387 R |
| 4,921,735 | 5/1990 | Bloch | 280/728 |
| 5,011,183 | 4/1991 | Thornton et al. | 280/728 |
| 5,048,863 | 9/1991 | Henseler | 280/743 |
| 5,078,423 | 1/1992 | Fujita | 280/728 |
| 5,094,477 | 3/1992 | Togawa | 280/728 |
| 5,100,168 | 3/1992 | Horiuchi et al. | 280/728 |

FOREIGN PATENT DOCUMENTS

| | | |
|---|---|---|
| 51-4742 | of 0000 | Japan . |
| 54-576 | of 1979 | Japan . |
| 56-43890 | 10/1981 | Japan . |
| 57-58228 | of 1982 | Japan . |
| 1254446 | 10/1989 | Japan . |

Primary Examiner—Ellis P. Robinson
Assistant Examiner—Rena L. Dye
Attorney, Agent, or Firm—Finnegan, Henderson, Farabow, Garrett & Dunner

[57] ABSTRACT

This invention relates to an impact absorbing bag for an automobile, that is, an air bag, consisting of seamless tubular woven fabric (1) which comprises a connecting portion (B1) formed around a non-connecting portion (B2), is at least partially covered with a polymer covering layer (2) on the surface thereof and has a gas introducing hole (3) on one of its surfaces. The seamless tubular woven fabric (1) can be prepared by cutting circularly a woven fabric having the non-connecting portion (B2) formed in succession. The bag may be turned inside out so that its inside and outside are reversed.

8 Claims, 3 Drawing Sheets

007# IMPACT ABSORBING AIR BAG AND METHOD FOR MANUFACTURING SAME

FIELD OF THE INVENTION

The present invention relates to an air bag and a method of manufacturing the same. More particularly, the present invention relates to an impact absorbing air bag housed in a center portion of a steering wheel which is capable of sensing impact caused when a car collides with some object and instantaneously inflating to ensure the safety of a driver or the like, and to a method for manufacturing the air bag.

BACKGROUND TECHNOLOGY

When a car collides with an oncoming car or another object, the driver may smash his face strongly onto the steering wheel or the front glass. If the impact generated at that time can be reduced, it is possible to prevent death or serious injury to the driver.

In many countries, drivers are obligated by law to use seat belts as one means of safety upon collisions, but the effective reduction of the impact by seat belts is not sufficient when a car collides with an object at a high speed.

Therefore, use of an air bag system, i.e., a system capable of sensing an impact caused when a car collides with an object and instantaneously inflating a bag housed in a center portion of a steering wheel or the like to ensure the safety of the driver or the like is now being considered in many countries as a more reliable safety measure.

One conventional air bag has been manufactured by forming a polymer layer on a plain woven fabric, providing a gas introducing hole in one of the woven fabrics, superimposing two woven fabrics with polymer layers in a state with the polymer layer sides facing each other, and sewing together circumferential edges of the two woven fabric. For example, Japanese Unexamined Patent Publication No. 51-4742, in the portion explaining the conventional air bags, describes that conventional air bags are obtained by cutting two circular pieces of woven fabrics from two regular square pieces of woven fabrics and sewing together the circumferential edges of the two circular pieces.

In air bags, a gas is instantaneously fed into the bag by explosion of a pyrotechnic, so the air bag must have a strength sufficient to endure the impact force caused by the explosion. The above-mentioned method of manufacturing air bags using a sewing process has several problems in this regard. There are many manual working processes involved, so there is a chance of decreased strength of the sewn portions and inspections of the strength of the sewn portions and the air permeability of the woven fabric take much time. The overall reliability of air bags manufactured by this method is low.

A method of manufacturing air bags using a tubular weaving method has been proposed. Japanese Examined Utility Model Publication No. 57-58228, corresponding to Japanese Unexamined Utility Model Publication No. 49-56352, discloses an impact absorbing tubular woven fabric having bag portions formed by alternately folding two woven up and down at a middle portion. In this tubular weave, a first bag portion and a second bag portion having a connected portion, which consists of the upper woven fabric and lower woven fabric woven together in a jointed weave, are alternately provided. The second bag portion is smaller than the first bag portion. The fact that this tubular woven fabric could be coated was mentioned in this patent publication, but a detailed explanation was only given of a continuous body of an air bag.

Further, Japanese Examined Patent Publication No. 54-576, corresponding to Japanese Unexamined Patent Publication No. 50-7232, disclose an air bag having an upper connected portion and a lower connected portion having weft threads with larger shrinkage ratios than their warp threads. In the description of the invention and the drawings of this publication, there was shown an air bag having a square shape in plan view, provided at the outer layer thereof with a covering layer.

However, when making separate bags from the impact absorbing tubular woven fabric disclosed in Japanese Examined Utility Model Publication No. 57-58228, the above tubular woven fabric should be cut along the widthwise direction in a portion, so the shape of the cut fabric necessarily becomes square. An air bag having a square shape has problems such that the air pressure is not applied uniformly over the air bag, the appearance of the air bag is inferior, and it is difficult to neatly house the air bag in the steering wheel. The air bag disclosed in Japanese Examined Patent Publication No. 54-576 also has a square shape, so it has the same problems.

It is possible to make the chamber into which air is blown an octagon by sewing the four corners of an air bag of a square shape (in this case, the appearance of the air bag is still square), but this sewn air bag has disadvantages of the large cost of the labor to sew the corners, the weaker strength of the sewn portions compared to the other portions, and the lack of uniformity. Even if this air bag is turned inside out by pulling the inside of the air bag through the opening at the center portion of the air bag for the air insertion, only the appearance of the air bag is improved. The other disadvantages, such as the inferior uniformity, are not eliminated.

An object of the present invention is to provide an impact absorbing bag having superior uniformity, appearance, and reliability and having the ability to be easily manufactured.

DISCLOSURE OF THE INVENTION

An air bag in accordance with the present invention is formed of a seamless tubular woven fabric to provide a central zone of separate layers, having substantially a circular shape and a circumferential zone, having a ring-like shape and formed by a connected portion of the tubular weave structure or by a connected portion of the tubular weave structure with a non-tubular weave structure, wherein the transition between the non-tubular weave structure and the tubular weave structure is continuous. Further, at least one portion of the surface of the seamless tubular woven fabric is provided with a polymer covering layer. A gas introducing hole is provided in the non-connected circular portion of the tubular weave structure through one layer of the seamless tubular woven fabric.

Another type of air bag in accordance with the present invention is a bag having an inside-out structure formed by pulling out the inside of the above-mentioned impact absorbing bag through the gas introducing hole.

The manufacturing method of the impact absorbing bag in accordance with the present invention, includes the following steps, the order of which can be arbitrarily set:

a step of obtaining a continuous body of a seamless tubular woven fabric by continuously weaving a tubular weave structure in which a plurality of warp threads are woven with a plurality of weft threads in a manner that as the weft picking operation progresses, the length of the weft pick to form the connected portion is progressively varied inversely with the length of the weft pick of the non-connected tubular portion so that a substantially circular non-connected tubular portion shape is formed.

a step of forming a polymer layer on at least a portion of a surface of the obtained continuous body.

a step of cutting the continuous body of the seamless tubular woven fabric in a circular shape to provide a seamless unconnected tubular woven fabric in a central circular zone, and a circumferential zone, having a ring-like shape and formed by a connected portion of the tubular weave structure or by a connected portion of the tubular weave structure and a non-tubular weave structure, the transition between the non-tubular weave structure and the tubular weave structure being continuous, and a step of providing a gas introducing hole in the non-connected portion of the tubular weave structure through one layer of the seamless tubular woven fabric.

Another manufacturing method of the impact absorbing bag in accordance with the present invention further includes a step of turning the air bag inside out by pulling out an inner side of the impact absorbing bag through the gas introducing hole.

The present invention will now be described in detail.

An air bag in accordance with the present invention uses as a base woven fabric structure a seamless tubular woven fabric 1 (FIG. 3) having a central zone with a substantially circular shape and formed by a non-connected portion B2 of a tubular weave portion B, and a circumferential zone of ring-like shape and formed either by a connected portion B1 of the tubular weave structure B or by the connected portion B1 and a non-tubular weave structure A, in which the transition between the non-tubular weave structure A and the tubular weave structure B is continuous as shown in FIG. 1.

The seamless tubular woven fabric as described herebefore can be obtained by preparing a continuous body of the seamless tubular woven fabric shown in FIG. 1 and manufactured by repeating at least one tubular weave structure B in which a plurality of warp threads are woven with a plurality of weft threads in a manner that as the weft picking operation is repeated, the length of weft pick across the width of the connected portion B1 is first decreased and then increased, thus forming a non-connected portion B2 having substantially a tubular and circular shape, or by alternately repeating the above-described tubular weave structure and a non-tubular weave structure A, and then cutting the continuous body of the seamless tubular woven fabric or by cutting a segment from the continuous body of substantially circular shape.

For example, first, the non-tubular weave structure A is formed by repeating a non-tubular weave until the predetermined length is obtained and then the tubular weave structure B, having the connected portion B1 and the non-connected portion B2 is manufactured by performing a tubular weave operation, i.e., a warp and weft double weaving weave in which a front layer and a back layer are connected to each other at both edge portions, in such a manner that as the weft picking operation is repeated, first, the picking length across the width of the connected portion B1 is decreased and then increased to define the circular portion B2. After that, a continuous body in which a plurality of the unconnected seamless tubular woven fabric zones B2 are aligned in a row, as illustrated in FIG. 1, can be obtained by repeating the non-tubular weaving operation and the tubular weaving operation.

When a connected portion B1 having some width is further formed at a middle portion of the continuous body width, a continuous body can be obtained in which a plurality of the unconnected seamless tubular woven fabric zones are arranged in two rows as illustrated in FIG. 6. A continuous body in which a plurality of unconnected seamless tubular woven fabric zones are arranged in rows of three or more can be easily obtained in the same manner as that of the previous case. Further, a continuous body in which a plurality of unconnected seamless tubular woven fabric zones are arranged in a zigzag pattern, as illustrated in FIG. 7, can be obtained by repeating a required number of times only the tubular weaving operation in which the length in the widthwise direction of the connected portion B1 at both edge portions is gradually changed and not applying the non-tubular weaving operation.

The weaving of the seamless tubular woven fabric can be performed by using a dobby loom, a jacquard loom, or the like.

The shape of the non-connected portion B2 in the tubular weave structure B is generally circular or nearly circular, but it is possible to make a deformed circle as illustrated in FIG. 8. The air bag including the non-connected portion B2 of the deformed circle can be usefully used as an air bag in the front passenger seat or the rear passenger seats.

A plain weave, twill weave, satin weave, or the like can be used as the weave in the non-connected portion and the connected portion.

As the weft thread and the warp thread used for manufacturing the seamless tubular woven fabric 1, a thread produced from a polyester fiber, polyamide fiber, including aramide fibers, acrylic fiber, polyvinyl alcohol fiber, polyvinylidene chloride fiber, polyolefin fiber, polyurethane fiber, fluoroplastic fiber, semisynthetic fiber, regenerated fiber, natural fiber, carbon fiber, glass fiber, ceramic fiber, metal fiber, or the like can be used. Further, a thread having a suitable elasticity can be used.

As shown in FIG. 2, a polymer layer 2 is provided on at least one portion of a surface of the seamless tubular woven fabric 1 to prevent permeation of gases through the woven fabric 1. Generally, the polymer layer 2 is provided on the entire surface of both sides of the seamless tubular woven fabric, but the polymer layer may also be provided on just the surface of the side facing the driver when the air bag is mounted in a steering wheel.

As examples of the polymer layer 2, mention may be made of film produced from a polyurethane resin, polyester resin, polyamide resin, polyvinylidene chloride resin, polyvinyl chloride resin, polyolefin resin, fluorine resin, silicone resin, polystyrene resin, cellulose polymer, natural rubber, synthetic rubber, or the like. A polymer capable of forming an elastic film is useful. A polyurethane elastomer, a polyester elastomer, a polyamide elastomer, a polyolefin elastomer, or the like can be used as typical elastic polymers. A polyurethane elastomer is particularly preferable. Here, "polyurethane elastomer" denotes a rubber-like elastic polymer having a urethane radical in its molecular structure and includes an adipate ester type, a polyether type, a caprolactone type, and a polycarbonate type.

The polymer is generally applied in a film state, liquid state, solution state, dispersion state, or a molten state on the outer surface of both sides of the seamless tubular woven fabric and then is made into a laminate or covering by heating, drying, cooling, irradiation by activation energy, or the like.

Further, if necessary, it is possible to use a method in which the warp thread and/or weft thread is previously coated with the polymer, a fabric is made by the above warp threads and weft threads, and the woven fabric is heated to increase the flowability of the polymer on the surface of the thread so that gaps in the woven fabric structure are filled with the polymer.

The polymer layer 2 may be formed on the seamless tubular woven fabric 1 for individual units of the fabric 1. However, it is more efficient to form the polymer layer on a continuous body of the seamless tubular woven fabrics. It is possible to apply the polymer layer to a segment cut from a continuous body, for example, a segment including two seamless tubular woven fabrics, a segment including three seamless tubular woven fabrics, or a segment having the shape of a square.

A gas introducing hole 3 (FIG. 3) is arranged on the central zone at one side of the seamless tubular woven fabric 1. The gas introducing holes 3 may be made in the continuous body, the segments, or the individual units.

To obtain the individual units of the seamless tubular woven fabric 1 from the continuous body, the connected portion B1 of the tubular weave structure B or the connected portion B1 and the non-tubular weave structure A may be cut in a circle having a diameter larger than that of the zone B2 to space the cut outwardly from the circumferential edge of the non-connected portion B2 having a substantially circular shape in the tubular weave structure B. It is advantageous to use melting rather than mechanical cutting as a cutting method. Thus, individual units including the non-connected portion B2 having the circular shape of the tubular weave structure B and a ring-like portion arranged circumferentially on the non-connected portion B2 and comprising the connected portion B1 or the connected portion B1 and the non-tubular weave structure A is obtained.

The polymer layer 2 is generally formed on the seamless tubular woven fabric 1 from the outside of the fabric 1. Therefore, the bag obtained by this method has a slightly inferior feeling. Further, since the connected portion B1 of the tubular weave structure B or the connected portion B1 and the non-tubular weave structure A are present in a circumferential portion of the bag, the appearance of the bag is not always good. If the bag is turned inside-out by pulling out the inside of the air bag through the gas introducing hole 3, the feeling and the appearance of the obtained air bag are remarkably improved. Therefore, it is advantageous to use an inside-out air bag in terms of the merchandiseability.

It is possible to provide one or more strands or strips inside the impact absorbing bag in accordance with the present invention for limiting the inflation of the bag between the front of the bag, as seen from the driver's position, and the opposite side of the bag.

The impact absorbing bag in accordance with the present invention is housed in the central portion of the steering wheel with the gas introducing hole 3 connected to a gas generator. When an impact of a predetermined value or more, for example, an impact generated when a car having a speed of 16 km/hr or 25 km/hr collides head on with an object, is sensed by a mechanical sensor or an electrical sensor, gas generated by a pyrotechnic is suddenly fed into the bag, and the bag is simultaneously inflated. For example, the bag is inflated in 0.06 seconds after sensing of the impact. It is also possible to feed a gas having a high pressure from a gas cylinder. When the air bag is used for the front passenger seat or rear passenger seats, portions capable of housing the impact absorbing bags may be suitably arranged inside the car.

Effects of the Invention

The impact absorbing bag according to the present invention uses as a base woven structure a seamless tubular woven fabric constituted with a central zone, having substantially a circular shape and formed by a non-connected portion B2 of a tubular weave structure B, and a circumferential zone, having a ring-like shape and formed by a connected portion B1 of the tubular weave structure B or by the connected portion B1 and a non-tubular weave structure A, wherein the transition between the non-tubular weave structure A and the tubular weave structure B is continuous. Due to this, it is superior in terms of uniformity, strength, and adjustment of the air-permeability compared with the conventional method of forming a bag by cutting out circular pieces of fabric from two square pieces of fabric and sewing together the circumferences of the same. Therefore, a high degree of reliability can be ensured as an impact absorbing bag. Further the manufacturing steps are streamlined and inspection time can be reduced, so it is advantageous in terms of productivity as well.

Even compared with a square shaped air bag, seen in plan view, prepared from a tubular weave, the air bag of the present invention is far superior in use.

Figure 1:
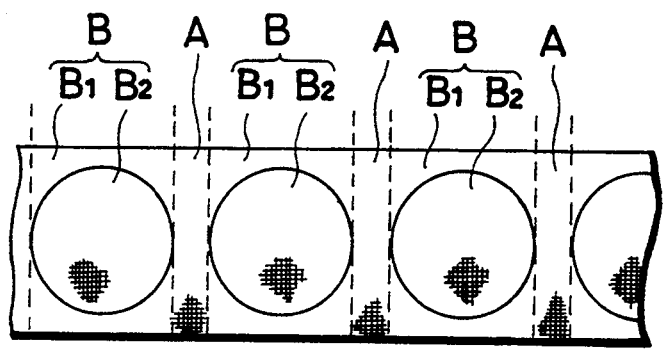
FIG. 1 is a plan view illustrating an example of a continuous body of a seamless tubular woven fabric in accordance with the present invention.
Figure 2:
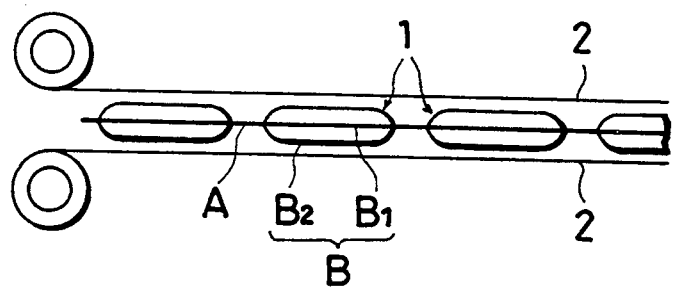
FIG. 2 is a front view illustrating the continuous body illustrated in FIG. 1 and provided with a polymer layer.
Figure 3:
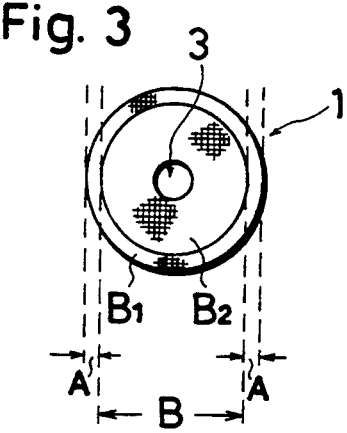
FIG. 3 is a plan view illustrating an example of one individual unit of the seamless tubular woven fabric provided with a gas introducing hole.

In the figures, the reference numeral 1 represents a seamless tubular woven fabric, 2 represents a polymer covering layer, 3 represents a gas introducing hole, 4 represents a strand or strip for limiting the inflation of the bag, 5 represents a reinforcement piece, A represents a non-tubular weave structure, B represents a tubular weave structure, B1 represents a connecting portion and B2 represents a non-connected portion.

BEST MODE FOR CARRYING OUT THE INVENTION

The present invention will now be explained in further detail by examples.

EXAMPLE 1

FIGS. 1 to 4 show an example of the steps for manufacturing an impact absorbing bag according to the present invention.

Use was made of polyester multifilament yarn as the warp and weft and weaving was performed using a jacquard loom. First, non-tubular weaving was performed until a predetermined width to form a non-tubular weave structure A, then tubular weaving wherein the upper and lower layers are joined only at the two edge portions was performed so that the more the weft picking operation was repeated, first, the length in the widthwise direction of a connecting portion B1 was progressively shortened and, then, the length in the widthwise direction of the connecting portion B1 was progressively shortened, so that the circular tubular weave structure B was formed. These non-tubular and tubular weaving steps were repeated.

By this, a continuous body of seamless tubular woven fabric 1 having a single row of non-connected circular portion, B2 in the tubular weave structures B was obtained. (See FIG. 1.)

On the two sides of the continuous body of the seamless tubular woven fabric 1 a polyether type polyurethane elastomer was coated. This was heated to dry and further cured to form a polymer covering layer 2. (See FIG. 2.)

Next, separate circular pieces were cut by melting at the connected portion B1 of the tubular weave structure B and the non-tubular weave structure A so as to give a diameter somewhat larger than the circular non-connected portion B2. There was thus obtained a seamless tubular woven fabric 1 having a polymer covering layer 2 with a central zone, having a circular shape, formed by a non-connected portion B2 of a tubular weave structure B and a circumferential zone, having a ring-like shape, formed by a connected portion B1 of the tubular weave structure B. (See FIG. 3.)

Next, a hole was made in the center portion of the non-connected portion B2 on one side, along with the polymer layer 2, to form the gas introducing hole 3 and thus give an impact absorbing bag. (See FIG. 3.)

Further, this individual unit was turned inside out from the gas introducing hole 3 to prepare the desired impact absorbing air bag. (See FIG. 4.)

Figure 4:
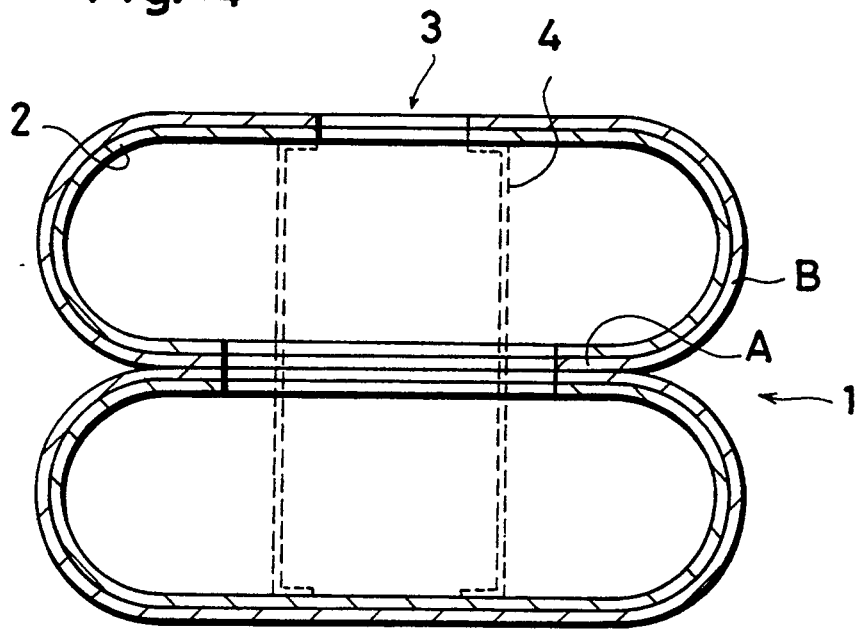
FIG. 4 is a cross-sectional view of an example of the air bag in accordance with the present invention obtained by turning inside-out an individual unit of the air bag illustrated in FIG. 3 through the gas introducing hole.
Figure 5:
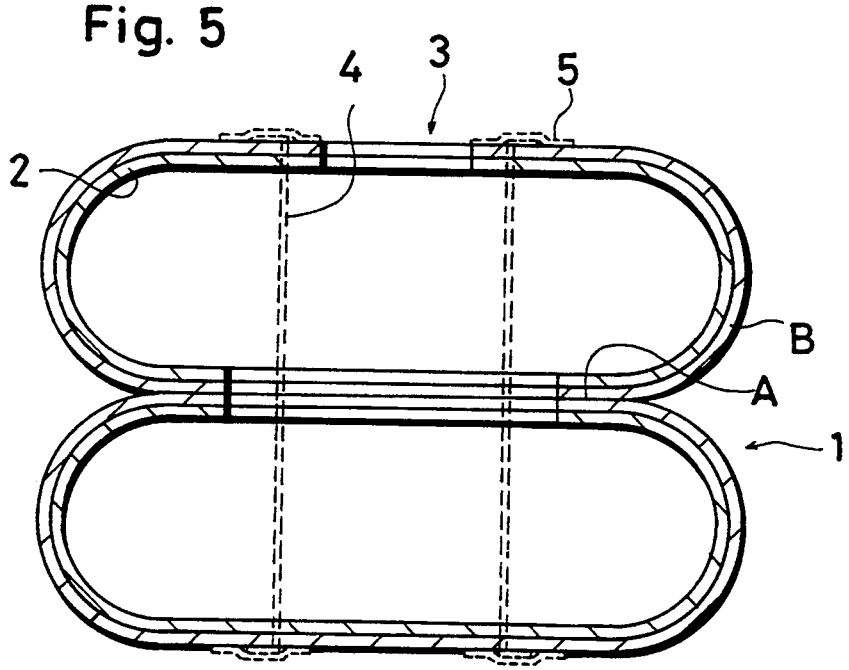
FIG. 5 is a cross-sectional view of another example of the air bag obtained by turning inside-out an individual unit illustrated in FIG. 3 through the gas introducing hole.

Note that (4) in FIG. 4 is a strip for limiting the inflation of the bag, which is provided according to need. It is attached inside the bag between the top surface and bottom surface. This inflation limiting strip 4, as shown in FIG. 5, may be attached inside the bag between the top surface and bottom surface by tearing a portion of the top surface and bottom surface of the bag, adhering the two ends of the strip 4 so that they stick outside, then adhering a reinforcement piece 5 over the attached portion.

EXAMPLE 2

Use was made of nylon multifilament yarn as the warp and weft and weaving was performed using a jacquard loom. Except for this, the same procedure was followed as in Example 1 so as to prepare a continuous body of a seamless tubular woven fabric 1.

Next, a film of an adipate ester type polyurethane elastomer was laid over the two surfaces of a continuous body of the seamless tubular woven fabric 1. The composite was passed between heating rollers for lamination, thereby forming a polymer covering layer 2. A hole was made in the center portion of the non-connected portion B2 of the tubular weave structure B on one side, along with the polymer layer 2, to form the gas introducing hole 3.

Finally, this individual unit was turned inside out from the gas introducing hole 3 to prepare the desired impact absorbing bag.

EXAMPLE 3

Figure 6:
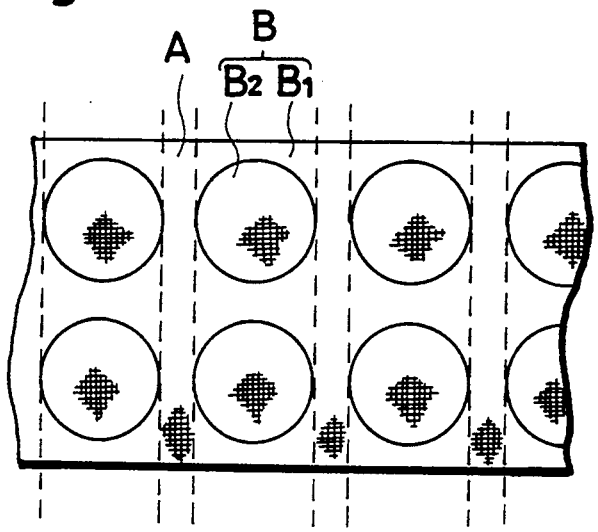
FIGS. 6 to 8 are plan views illustrating other examples of the continuous bodies of the air bag in accordance with the present invention.
Figure 7:
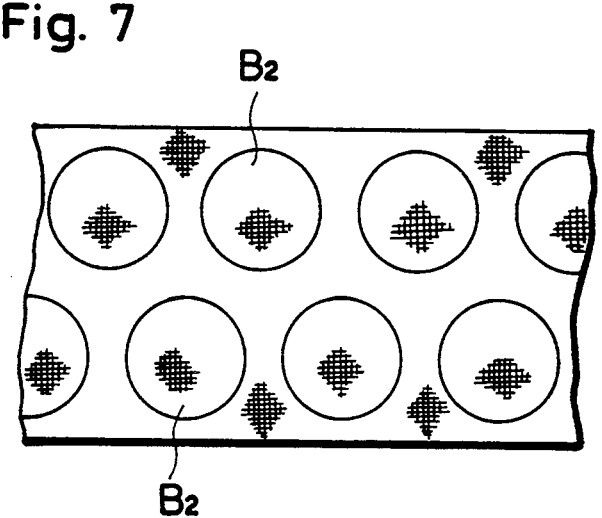
Figure 8:
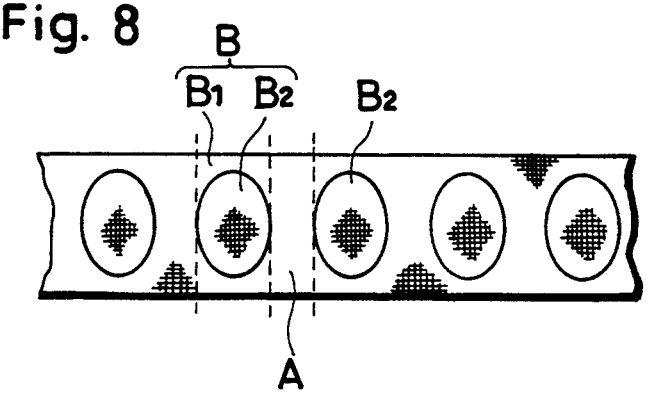

FIGS. 6 to 8 are plan views showing other examples of the continuous body of the impact absorbing bag of the present invention.

In Examples 1 and 2, a single row of continuous bodies of a seamless tubular woven fabric 1 was obtained and the impact absorbing bag prepared from the same, but by providing a connected portion B1 at not only the two edges, but also the width at the intermediate portion with the two edges in the tubular weaving step, it is possible to obtain two rows of continuous bodies as shown in FIG. 6. It is also possible to prepare impact absorbing bags similarly from such two rows of continuous bodies.

The two rows of continuous bodies in FIG. 7 are prepared by repeating a necessary number of times only the step of tubular weaving wherein the length in the widthwise direction of the connected portion B1 at the two edges is changed as previously described to form the circular zones B2.

The continuous body of FIG. 8 was prepared by making the non-connected portion B1 of the tubular weave structure B a deformed circle in shape.

Industrial Utility

The impact absorbing bag of the present invention, housed in the center portion of the steering wheel, is useful for the object of instantaneously inflating when sensing an impact of collision of the car and ensuring driver safety. It may be used not only for the object of ensuring driver safety, but also for the object of ensuring the safety of the passengers in the front passenger seat and rear passenger seats.

I claim:

1. An air bag comprising:
   a seamless woven fabric having a central zone of substantially circular shape and formed by a non-connected portion (B2) of a tubular weave structure (B) to provide front and back layers in the central zone, and a circumferential zone of ring-like shape and formed by a connected portion (B1) of the tubular weave structure (B) and a non-tubular weave structure (A), wherein the transition between the non-tubular weave structure (A) and the tubular weave structure (B) is continuous;
   at least one side of said non-connected tubular woven fabric being provided with a polymer covering layer (2); and
   a gas introducing hole (3) in the non-connecting portion (B2) of the tubular weave structure (B) in one of the front and back layers of the central zone.

2. An air bag in accordance with claim 1, including at least one strand (4) for limiting the inflation of the bag is provided inside the bag between the front and back layers of the central zone.

3. An air bag according to claim 1 turned inside-out by pulling out an inside of the said bag through said gas introducing hole.

4. An air bag in accordance with claim 3, wherein at least one strand (4) for limiting the inflation of the bag is provided inside the impact absorbing bag between the front of the bag, as seen from the driver's position, and the opposite side of the bag.

5. A method for manufacturing an air bag, comprising the steps of:
   forming a continuous seamless tubular woven fabric having connected portions and non-connected portions by repeating a tubular weave weft picking operation to progressively weave a weft thread with a plurality of warp threads in a manner so that as the weft picking operation is repeated, the pick length in the connected portion (B1) is varied inversely as the pick length in the non-connected portion to provide at least one non-connected portion (B2) with a substantially circular shape;
   forming a polymer layer on at least one side surface of the formed fabric;
   cutting the connected portions of the formed fabric in a circular shape to provide a seamless tubular woven fabric having a central zone of substantially circular shape and formed by and a circumferential zone of ring-like shape and formed by a connected portion (B1) of the tubular woven fabric; and
   providing a gas introducing hole in said non-connected portion (B2) of at one side of said seamless tubular woven fabric.

6. A method for manufacturing an air bag as recited in claim 5 including a step of turning the impact absorbing bag inside out by pulling out an inner side of the impact absorbing bag through the gas introducing hole.

7. An air bag comprising:
   a non-connected, double layer, inflatable tubular woven fabric portion of substantially circular configuration and defining a central zone;
   a non-inflatable fabric portion of ring-like configuration peripherally joining the double layers of the central zone, at least a part of said non-inflatable fabric portion of ring-like configuration including non-tubular woven fabric;
   both said fabric portions being defined by common interwoven warp and weft threads as a seamless, continuously woven fabric;
   a passage formed in said central zone for introducing a gas into the bag to inflate the bag; and
   a polymer covering layer on at least one side of said non-connected, double layer, inflatable tubular woven fabric.

8. An air bag comprising:
   a non-connected, double layer, inflatable tubular woven fabric portion of substantially circular configuration and defining a central zone;
   a non-inflatable fabric portion of ring-like configuration peripherally joining the double layers of the central zone;
   both said fabric portions being defined by common interwoven warp and weft threads as a seamless, continuously woven fabric;
   a passage formed in said central zone for introducing a gas into the bag to inflate the bag; and
   a polymer covering layer on at least one side of said non-connected, double layer, tubular woven fabric.

* * * * *

UNITED STATES PATENT AND TRADEMARK OFFICE
CERTIFICATE OF CORRECTION

PATENT NO. : 5,336,538
DATED : August 9, 1994
INVENTOR(S) : Atsushi KITAMURA

It is certified that error appears in the above-indentified patent and that said Letters Patent is hereby corrected as shown below:

Claim 5, column 9, line 27, after "formed by" insert

--the at least one non-connected portion (B2)--.

Signed and Sealed this

Third Day of January, 1995

*Attest:*

BRUCE LEHMAN

*Attesting Officer*    *Commissioner of Patents and Trademarks*